(12) United States Patent
Ju et al.

(10) Patent No.: US 10,468,796 B2
(45) Date of Patent: Nov. 5, 2019

(54) METHOD FOR MOLDING ELECTRICAL CONNECTOR

(71) Applicant: LOTES CO., LTD, Keelung (TW)

(72) Inventors: Ted Ju, Keelung (TW); Wen Wei Lin, Keelung (TW); Li Ming Zhang, Keelung (TW)

(73) Assignee: LOTES CO., LTD, Keelung (TW)

( * ) Notice: Subject to any disclaimer, the term of this patent is extended or adjusted under 35 U.S.C. 154(b) by 260 days.

(21) Appl. No.: 15/641,680

(22) Filed: Jul. 5, 2017

(65) Prior Publication Data

US 2017/0302014 A1 Oct. 19, 2017

Related U.S. Application Data

(63) Continuation of application No. 14/621,134, filed on Feb. 12, 2015, now Pat. No. 10,008,793.

(Continued)

(51) Int. Cl.

| H01R 12/71 | (2011.01) |
| H01R 24/78 | (2011.01) |
| H01R 12/00 | (2006.01) |
| H01R 24/00 | (2011.01) |
| H01R 13/6477 | (2011.01) |
| H01R 12/70 | (2011.01) |
| H01R 13/6594 | (2011.01) |
| H01R 13/6585 | (2011.01) |
| H01R 24/60 | (2011.01) |

(Continued)

(52) U.S. Cl.
CPC ........... *H01R 12/712* (2013.01); *B29C 63/00* (2013.01); *H01R 12/00* (2013.01); *H01R 12/707* (2013.01); *H01R 13/6477* (2013.01); *H01R 13/6585* (2013.01); *H01R 13/6594* (2013.01); *H01R 24/00* (2013.01); *H01R 24/60* (2013.01); *H01R 24/78* (2013.01); *H01R 43/18* (2013.01); *H01R 2107/00* (2013.01)

(58) Field of Classification Search
CPC .... H01R 12/712; H01R 12/00; H01R 12/707; H01R 13/6477
USPC .................................................. 439/607.05
See application file for complete search history.

(56) References Cited

U.S. PATENT DOCUMENTS 7,682,184 B2 * 3/2010 Ko ....................... H01R 12/594
439/495
7,758,379 B2 * 7/2010 Chen .................. H01R 13/6485
439/607.11

(Continued)

*Primary Examiner* — Alexander Gilman
(74) *Attorney, Agent, or Firm* — Locke Lord LLP; Tim Tingkang Xia, Esq.

(57) ABSTRACT

An electrical connector, including an insulating body having a base and a tongue extending forward from the base. Multiple terminals are arranged on the tongue at intervals to form at least one row, each terminal having a contact portion exposed from a surface of the tongue. A middle shielding sheet is insert molded in the tongue, and located closer to a middle position of the tongue than the contact portion in a vertical direction. Two recesses are provided backward from a front edge of the middle shielding sheet. A spacer portion is formed between the two recesses of the middle shielding sheet and embedded into the tongue. In a transverse direction, the middle shielding sheet has a through-hole between at least one recess and a side edge of the middle shielding sheet. A front edge of the spacer portion extends forward beyond a front edge of the through-hole.

18 Claims, 8 Drawing Sheets

Related U.S. Application Data

(60) Provisional application No. 62/024,728, filed on Jul. 15, 2014.

(51) Int. Cl.
   B29C 63/00 (2006.01)
   H01R 43/18 (2006.01)
   H01R 107/00 (2006.01)

(56) References Cited

U.S. PATENT DOCUMENTS

| | | | | |
|---|---|---|---|---|
| 8,956,187 B2 * | 2/2015 | He | | H01R 13/504 |
| | | | | 439/607.35 |
| 9,281,643 B1 * | 3/2016 | Tseng | | H01R 13/518 |
| 9,300,095 B2 * | 3/2016 | Lin | | H01R 24/60 |
| 9,312,641 B2 * | 4/2016 | Wang | | H01R 13/6585 |
| 9,350,121 B2 * | 5/2016 | Ju | | H01R 13/6585 |
| 9,379,499 B2 * | 6/2016 | Miyoshi | | H01R 24/60 |
| 9,466,924 B2 * | 10/2016 | Lin | | H01R 13/6585 |
| 9,564,716 B2 * | 2/2017 | Kao | | H01R 13/6586 |
| 9,577,387 B2 * | 2/2017 | Hu | | H01R 13/6597 |
| 9,728,885 B2 * | 8/2017 | Yokoyama | | H01R 13/42 |
| 9,761,973 B2 * | 9/2017 | Tsai | | H01R 12/716 |
| 9,768,544 B2 * | 9/2017 | Du | | H01R 13/521 |
| 9,774,130 B2 * | 9/2017 | Zhao | | H01R 4/02 |
| 9,912,111 B2 * | 3/2018 | Little | | H01R 24/60 |
| 10,164,791 B2 * | 12/2018 | Wang | | H01R 12/7023 |
| 2009/0190277 A1 * | 7/2009 | Hiew | | G06F 1/1632 |
| | | | | 361/56 |
| 2013/0231004 A1 * | 9/2013 | Yang | | H01R 12/57 |
| | | | | 439/607.36 |
| 2013/0244473 A1 * | 9/2013 | McKee | | H01R 13/641 |
| | | | | 439/489 |
| 2015/0171574 A1 * | 6/2015 | Little | | H01R 24/60 |
| | | | | 439/78 |
| 2015/0194770 A1 * | 7/2015 | Little | | H01R 24/60 |
| | | | | 439/607.27 |
| 2015/0340791 A1 * | 11/2015 | Kao | | H01R 24/60 |
| | | | | 439/676 |
| 2015/0372424 A1 * | 12/2015 | Little | | H01R 13/642 |
| | | | | 439/217 |
| 2016/0020572 A1 * | 1/2016 | Ju | | H01R 24/78 |
| | | | | 264/272.14 |

\* cited by examiner

METHOD FOR MOLDING ELECTRICAL CONNECTOR

CROSS-REFERENCE TO RELATED APPLICATION

This application is a continuation application of U.S. application Ser. No. 14/621,134, filed Feb. 12, 2015, which itself claims priority to and benefit of, under 35 U.S.C. § 119(e), U.S. provisional patent application Ser. No. 62/024,728, filed Jul. 15, 2014, entitled "ELECTRICAL CONNECTOR," by Ted Ju. The entire contents of the above-identified applications are incorporated herein by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD OF THE INVENTION

The present invention relates to a method for molding an electrical connector, and particularly to an electrical connector molding method that ensures the true position and the high-frequency performance of terminals.

BACKGROUND OF THE INVENTION

An existing electrical connector used to transmit a high-frequency signal includes an insulating body. An upper row of terminals and a lower row of terminals are disposed in the insulating body. The number of each row of terminals is large, and the terminal is in a slender shape, and includes a flat contact portion and a soldering portion bending downward and extending from the contact portion. A middle shielding sheet is disposed between the upper row of terminals and the lower row of terminals, and used to shield electromagnetic interference between the two rows of terminals. To ensure thinness of the electrical connector, the thickness of the insulating body of this electrical connector is generally small, and all the terminals can only be densely arranged in the insulating body. A molding process of this electrical connector is as follows: first performing molding to obtain a lower-row terminal module, where the lower-row terminal module is provided with a lower insulator and lower conducting terminals; performing stamping to obtain a row of upper conducting terminals, where the head and the tail (that is, front end of contact portion and tail end of soldering portion) of the row of upper conducting terminals are each connected to a strip; then, cutting off the strip of the front end, then placing the row of upper conducting terminals and a middle shielding sheet together into a mold cavity by using the strip of the tail end, and covering the upper conducting terminals and the middle shielding sheet with an upper insulator by means of an insert-molding technique to form an upper-row terminal module; and then assembling the upper-row terminal module and lower-row terminal module together to form the electrical connector.

However, after the upper conducting terminals are obtained by means of stamping, the entire row of the upper conducting terminals is connected into a whole only by the strip of the tail end. The upper conducting terminals are all of a slender structure, the entire row of upper conducting terminals is arranged densely, and in addition, a stress is generated when the soldering portion at the tail end bends. Those easily cause one end of a terminal that is not connected to the strip to warp or deflect, resulting in that two adjacent terminals are easily approaching or even contacting each other, and the true position of the terminals is bad. Thus, during subsequent insert-molding, the entire row of upper conducting terminals is not easily placed into the mold cavity. After the entire row of upper conducting terminals is forcibly placed into the mold cavity, and when the upper row conducting terminals are clamped and positioned by the positioning pin, the terminals are easily damaged by pressing or the mold is easily damaged.

Therefore, a heretofore unaddressed need exists in the art to address the aforementioned deficiencies and inadequacies.

SUMMARY OF THE INVENTION

In one aspect, the present invention is directed to a method for molding an electrical connector that ensures a good true position of terminals, and does not damage the terminals by pressing or damage a mold in a molding process.

In one embodiment, a method for molding an electrical connector includes the following steps:

S1: providing a row of first terminals, and integrally wrapping an insulating block on the first terminals using an insert-molding technique, where the insulating block covers a part of each first terminal, and the insulating block and the row of first terminals together form a first terminal module;

S2: providing a middle shielding sheet; and

S3: integrally wrapping an insulating body around the middle shielding sheet and the first terminal module using the insert-molding technique.

In one embodiment, in the step S1, the first terminal includes a contact portion, a soldering portion, and a connection portion connecting the contact portion and the soldering portion, and the insulating block covers a part of each connection portion. In the step S3, a part of each first terminal is insert-molded in the insulating body, the contact portion is exposed from a surface of the insulating body, and the soldering portion extends out of the insulating body.

In one embodiment, in the step S3, the middle shielding sheet includes a plate-shaped main body and a soldering pin extending from a back end of the main body. The main body is insert molded in the insulating body, and the soldering pin is exposed from the insulating body.

In one embodiment, in the step S1, a front end of each first terminal is connected to a first strip, and a back end of each first terminal is connected to a second strip. After the step S1, the method further includes a step S11: separating the first strip from the front ends of the first terminals, so that the front ends of the first terminals become free ends. In the step S2, a front end of the middle shielding sheet is connected to a third strip. After the step S2, and before the step S3, the method further includes a step S21: positioning the row of first terminals above the middle shielding sheet using the second strip and the third strip. After the step S3, the method further includes a step S31: separating the second strip from the back end of the first terminals.

In one embodiment, the method of the present invention further includes a step S4: providing a row of second terminals, and integrally wrapping a plastic block on the second terminals using the insert-molding technique, where the plastic block covers a part of each second terminal, and the plastic block and a row of second terminals together form a second terminal module. The step S4 and the steps S1, S2, and S3 may not in sequence.

In one embodiment, after the step S4, the method further includes a step S5: assembling and fix the second terminal module to the insulating body formed in the step S3.

In one embodiment, the row of first terminals includes a high-speed terminal and a non-high-speed terminal, where the high-speed terminal is a differential signal terminal for transmitting a universal serial bus (USB) 3.0 signal.

In another aspect, the present invention is directed to a method for molding an electrical connector. In one embodiment, the method includes the following steps:

S1: providing a row of first terminals, where the first terminal includes a first contact portion, a first connection portion extending from a first contact portion, and a first soldering portion bending from the first connection portion; and integrally wrapping an insulating block on the first connection portions using an insert-molding technique, where the insulating block and the row of first terminals together form a first terminal module;

S2: providing a middle shielding sheet, where the middle shielding sheet includes a plate-shaped main body and a soldering pin extending from a back end of the main body; and S3: integrally wrapping an insulating body around the middle shielding sheet and the first terminal module using the insert-molding technique, where the insulating body includes a base and a tongue extending from the base, the main body is insert molded in the tongue and the base, a part of each first terminal is insert molded in the insulating body, the first contact portion is exposed from a surface of the tongue, and the first soldering portion and the soldering pin extend out of the base.

In one embodiment, in the step S1, a front end of each first contact portion is connected to a first strip, and a back end of each first soldering portion is connected to a second strip. After the step S1, the method further includes a step S11: separating the first strip from the front ends of the first contact portions, so that the front ends of the first contact portions become free ends.

In one embodiment, in the step S2, a front end of the main body of the middle shielding sheet is connected to a third strip. After the step S2, and before the step S3, the method further includes a step S21: positioning the row of first terminals above the middle shielding sheet using the second strip and the third strip. After the step S3, the method further includes a step S31: separating the second strip from the back ends of the first soldering portions.

In one embodiment, the method of the present invention further includes a step S4: providing a row of second terminals, where each of the second terminals includes a second contact portion, a second soldering portion and a second connection portion connecting the second contact portion and the second soldering portion; and integrally wrapping a plastic block on the second connection portions using the insert-molding technique, where the plastic block and the row of second terminals together form a second terminal module. The step S4 and the steps S1, S2, and S3 may not in sequence. In the step S4, a front end of each second contact portion is connected to a fourth strip, a back end of each second soldering portion is connected to a fifth strip, and side edges of two second terminals located at an outermost side of the row of second terminals are separately connected to the fifth strip. After the step S4, the method further includes a step S41: separating the fourth strip from the front ends of the second contact portions, and separating the soldering portions of the second terminals from the fifth strip, so that a front end and a back end of each second terminal become free ends, and the side edges of the two second terminals at the outermost side are kept connected to the fifth strip.

After the step S41, the method further includes a step S5: driving the second terminal module by using the fifth strip, driving, by using the third strip, the insulating body formed in the step S31, and assembling and fixing the second terminal module to the insulating body. After the step S5, the method further includes a step S6: separately removing the third strip and the fifth strip. After the step S6, the method further includes a step S7: assembling an upper shielding sheet and a lower shielding sheet to an upper surface and a lower surface of the insulating body respectively; and then, sleeving the insulating body from back to front with a shielding case, and conducting the shielding case to the upper shielding sheet and the lower shielding sheet.

In one embodiment, in the step S3, the insulating block and the insulating body are fused and bonded.

In another aspect, the present invention further provides an electrical connector, which includes: an insulating body, having a base and a tongue extending forward from the base; a plurality of terminals arranged on the tongue at intervals respectively to form at least one row, each of the terminals having a contact portion exposed from a surface of the tongue; and a middle shielding sheet, insert molded in the tongue, the middle shielding sheet being located closer to a middle position of the tongue than the contact portion in a vertical direction, wherein two recesses are provided backward from a front edge of the middle shielding sheet, a spacer portion is formed between the two recesses of the middle shielding sheet, the spacer portion is embedded into the tongue, the middle shielding sheet is provided with a through-hole between at least one of the recesses and a side edge of the middle shielding sheet in a transverse direction perpendicular to a front-rear direction and the vertical direction, and a front edge of the spacer portion extends forward beyond a front edge of the through-hole.

In one embodiment, a width of each recess is smaller than that of the spacer portion in the transverse direction.

In one embodiment, the front edge of the through-hole extends forward beyond a rear edge of the recess.

In one embodiment, a distance between the through-hole and the side edge of the middle shielding sheet is smaller than a distance between the through-hole and the corresponding recess in the transverse direction.

In one embodiment, a first notch and a second notch are provided respectively from the side edge of the middle shielding sheet along the transverse direction, the first notch has a first inner side edge, the second notch has a second inner side edge, and the first inner side edge is located closer to the side edge of the middle shielding sheet than the second inner side edge.

In one embodiment, the insulating body is provided with a step portion between the tongue and the base, a thickness of the step portion is greater than that of the tongue and smaller than that of the base; the middle shielding sheet is partially embedded into the step portion, and is provided with a protruding portion between the first notch and the second notch; the first inner side edge protrudes out of a side surface of the tongue along the transverse direction; and the protruding portion partially protrudes out of a side surface of the step portion along the transverse direction.

In one embodiment, the terminals comprise a plurality of first terminals arranged on an upper surface of the tongue and a plurality of second terminals arranged on a lower surface of the tongue to form an upper row and a lower row, each of the first terminals and the second terminals comprise a pair of USB 2.0 terminals and a pair of differential signal terminals respectively located at two transverse sides of the pair of USB 2.0 terminals, the USB 2.0 terminals are located between extending lines of two opposite side edges of the spacer portion, and each pair of differential signal terminals is correspondingly located between each of the recesses and the side edge of the middle shielding sheet.

In one embodiment, the plurality of first terminals in the upper row and the plurality of second terminals in the lower row are vertically and symmetrically arranged, each of the plurality of first terminals and the plurality of second terminals comprise a grounding terminal located at an outer side of each of the pair of differential signal terminals, a power supply terminal located at an inner side of each of the pair of differential signal terminals, and a reserved terminal located between the power supply terminal and the USB 2.0 terminals, the power supply terminal is located closer to the differential signal terminal than the reserved terminal, the power supply terminal in the upper row is partially located right above the recesses, and the power supply terminal in the lower row is partially located right below the recesses.

In one embodiment, the middle shielding sheet is provided with a first middle hole across a central line thereof along the front-rear direction, a width of the first middle hole along the transverse direction is greater than that of at least one of the USB 2.0 terminals, the first middle hole is correspondingly located between the USB 2.0 terminals in the upper row and the USB 2.0 terminals in the lower row, the middle shielding sheet is provided with a plurality of first holes, at least one of the first holes is provided respectively at each of two transverse sides of the central line, a front edge of the first middle hole extends forward beyond a rear edge of the first holes, and the length of the first middle hole along the front-rear direction is shorter than a length of each of the first holes along the front-rear direction.

In one embodiment, the middle shielding sheet is provided with four of the first holes penetrating therethrough, wherein two of the four first holes are provided at each of two sides of the central line respectively, and the four first holes are arranged in a row with intervals along the transverse direction.

In one embodiment, the length of each of the first holes along the front-rear direction is greater than a width of each of the first holes along the transverse direction, and the width of the first middle hole along the transverse direction is greater than the length of the first middle hole along the front-rear direction.

In one embodiment, the spacer portion passes across the central line, the first middle hole is located right behind the spacer portion, and the two recesses are arranged axially and symmetrically about the central line serving as an axis of symmetry.

In one embodiment, the first middle hole is located between two of the first holes along the transverse direction.

In one embodiment, the middle shielding sheet is provided with a plurality of second holes, wherein at least one of the second holes is provided at each of the two transverse sides of the central line, and the second holes are located closer to the central line than the first holes.

In one embodiment, two of the second holes are arranged in a row along the transverse direction, and the second holes are further away from the spacer portion as compared to the first middle hole.

In one embodiment, the middle shielding sheet has a main body, and the main body has a front section located in the tongue; a rear section extending backward from the front section is located in the base, the width of the rear section is greater than that of the front section in the transverse direction; the front section is provided with the recesses, the spacer portion and the through-hole; and the rear section is provided with the second holes.

In one embodiment, the middle shielding sheet is provided with a second middle hole and a third middle hole respectively at a front side and a rear side of the first middle hole, and the second middle hole and the third middle hole are respectively across the central line.

In one embodiment, the length of the second middle hole along the front-rear direction is shorter than that of the third middle hole along the front-rear direction.

In one embodiment, a shielding case wraps the insulating body, the shielding case comprises an inner case wrapping the insulating body and an outer case covering the inner case; at least one first connection pin extends downward from the inner case along a vertical direction; at least one second connection pin extends downward from the outer case along the vertical direction; and the second connection pin is located in front of the first connection pin.

In one embodiment, two arc-shaped blocks respectively protrude upward from two sides of a top surface of the base, and viewed from a projection in the front-rear direction, the spacer portion is located between the two arc-shaped blocks.

In certain embodiments of the present invention, by first insert molding first connection portions of a row of first terminals in an insulating block, the row of first terminals is fixed as a whole. The insulating block plays a role of holding the first terminals, free ends of the first terminals are prevented from warping or deflecting, and two adjacent terminals can be prevented from contacting each other, so that true positions of the terminals are good. During subsequent insert-molding, the entire row of first terminals is easily placed into a mold cavity, so as to avoid damaging terminals by pressing or damaging of the mold when the first terminals are clamped and positioned by the positioning pin. Moreover, two recesses are provided backward from a front edge of the middle shielding sheet, and a spacer portion is formed between the two recesses of the middle shielding sheet. In a transverse direction perpendicular to a front-rear direction and the vertical direction, the middle shielding sheet is provided with a through-hole between at least one recess and a side edge of the middle shielding sheet, and the through-hole is used for allowing a positioning pin for injection molding to position the first terminal and the second terminal, thus preventing the first terminal and the second terminal from being obliquely punched by flowing plastics. A front edge of the spacer portion extends forward beyond a front edge of the through-hole, and the spacer portion is embedded into the tongue. Thus, the contact area between the middle shielding sheet and the tongue is increased to enhance the bonding force between the middle shielding sheet and the tongue, and the strength of a front end of the tongue is improved to ensure that the electrical connector has better structural stability.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
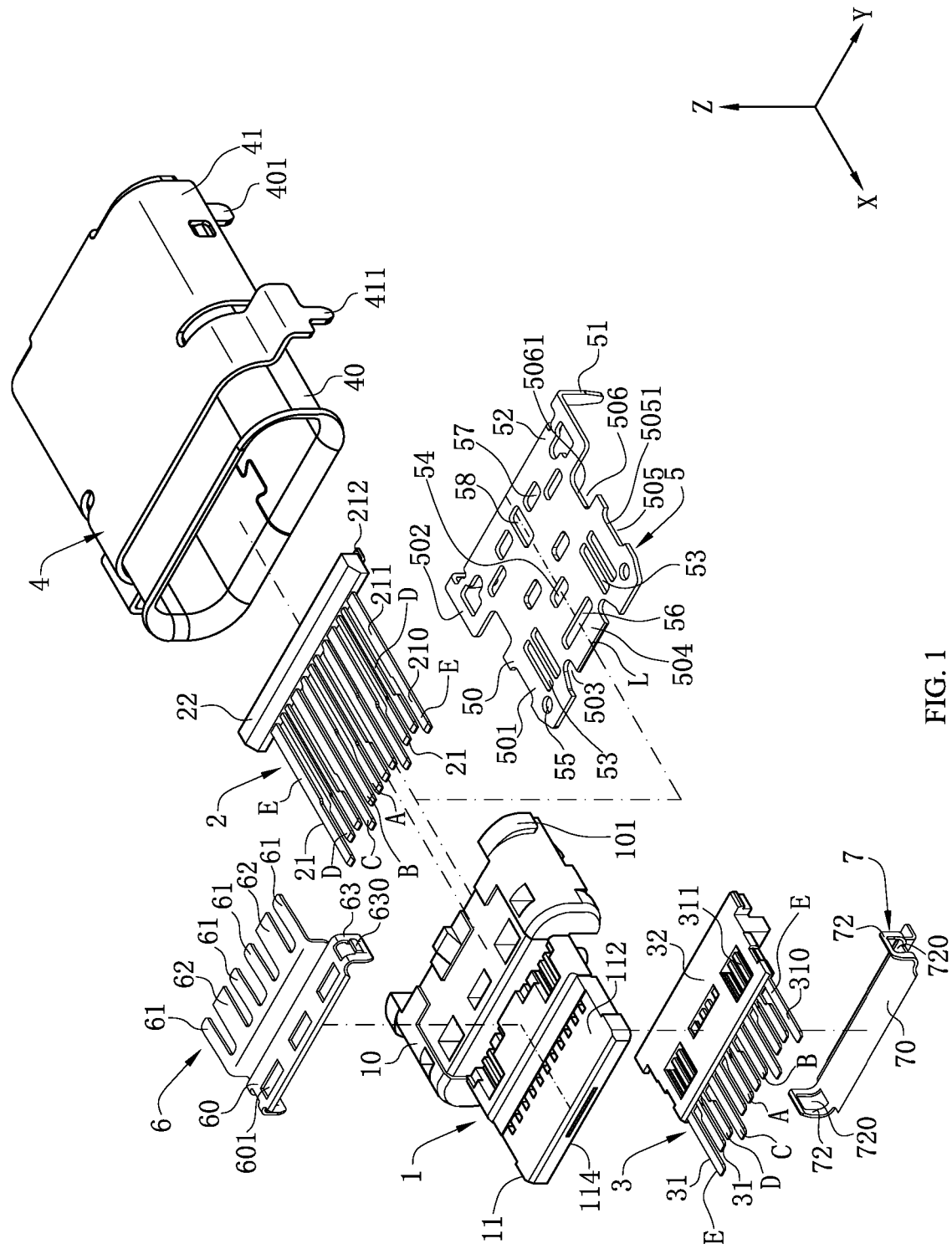
FIG. 1 is a schematic exploded view of an electrical connector according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

The description will be made as to the embodiments of the present invention in conjunction with the accompanying drawings in FIGS. 1-8. In accordance with the purposes of this invention, as embodied and broadly described herein, this invention, in one aspect, relates to a method for molding an electrical connector.

As shown in FIG. 1 to FIG. 4, an electrical connector molded using a method according to certain embodiments of the present invention includes an insulating body 1, a first terminal module 2 and a second terminal module 3 which are vertically disposed, and a shielding case 4 wrapping the insulating body 1, the first terminal module 2 and the second terminal module 3.

Figure 2:
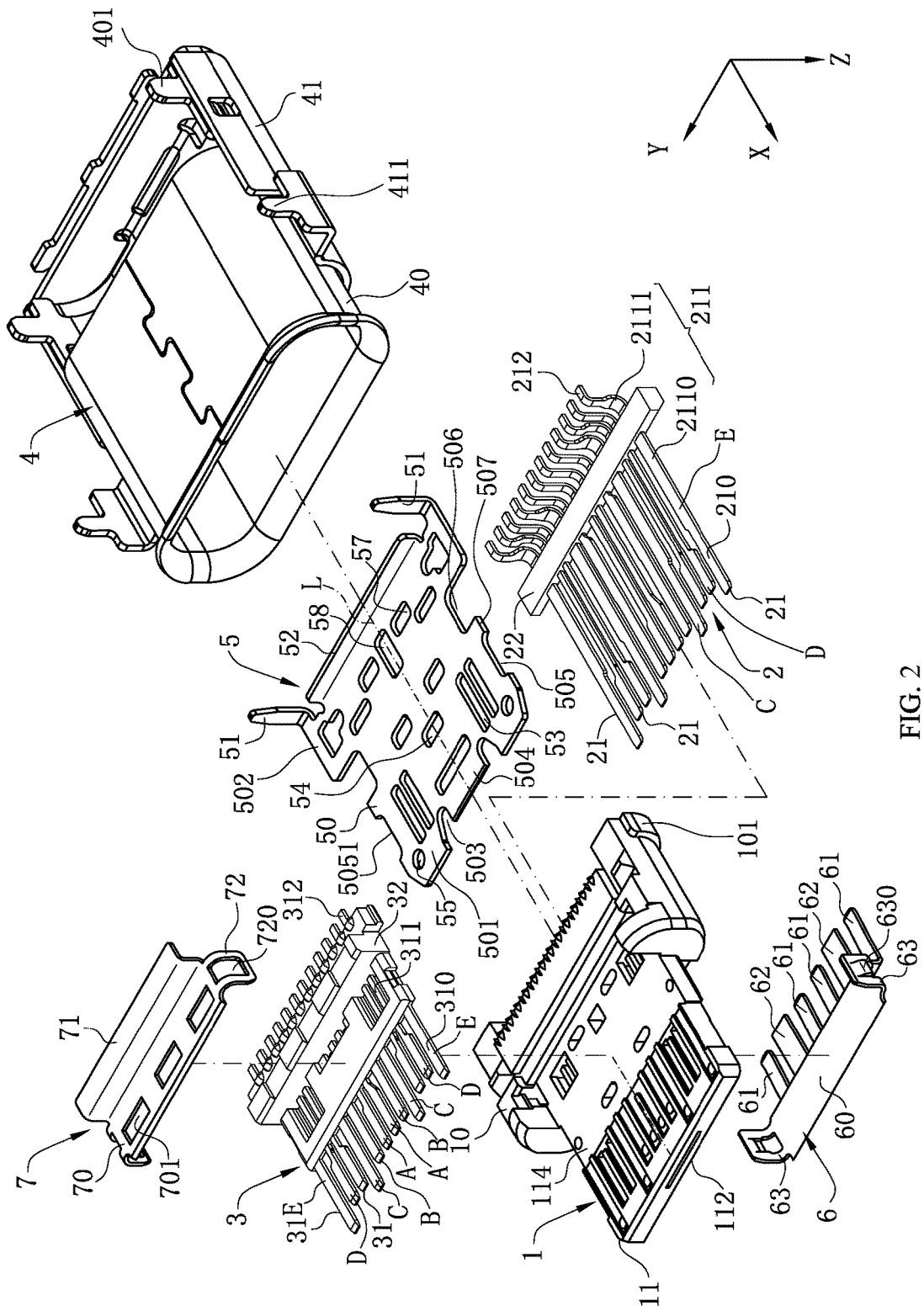
FIG. 2 is a schematic view of FIG. 1 viewed from another angle.

Referring to FIG. 1 and FIG. 2, the insulating body 1 is made of a plastic material, and includes a base 10 and a tongue 11 extending forward from the base 10. The thickness of the base 10 in a vertical direction is greater than the thickness of the tongue 11. The entire tongue 11 is rectangular along a front-rear direction, and the tongue 11 has an upper surface 112 and a lower surface 114 opposite to each other. The tongue 11 further has a left-right direction perpendicular to the front-rear direction and the vertical direction. For convenience of understanding, as shown in a three-dimensional coordinate system in FIG. 1, the axis X denotes a forward direction, the axis Y denotes a direction toward the right, and the axis Z denotes an upward direction. The left-right direction in this embodiment is a transverse direction. As shown in FIG. 1, an arc-shaped block 101 protrudes up from each of two sides of a top surface of the base 10. In the front-rear direction, the insulating body 1 is provided with a step portion 12 between the tongue 11 and the base 10, the thickness of the step portion 12 in the vertical direction is greater than that of the tongue 11 and smaller than that of the base 10, and the tongue 11, the step portion 12 and the base 10 are axially and symmetrically arranged along a central line of the tongue 11 along the front-rear direction.

Figure 3:
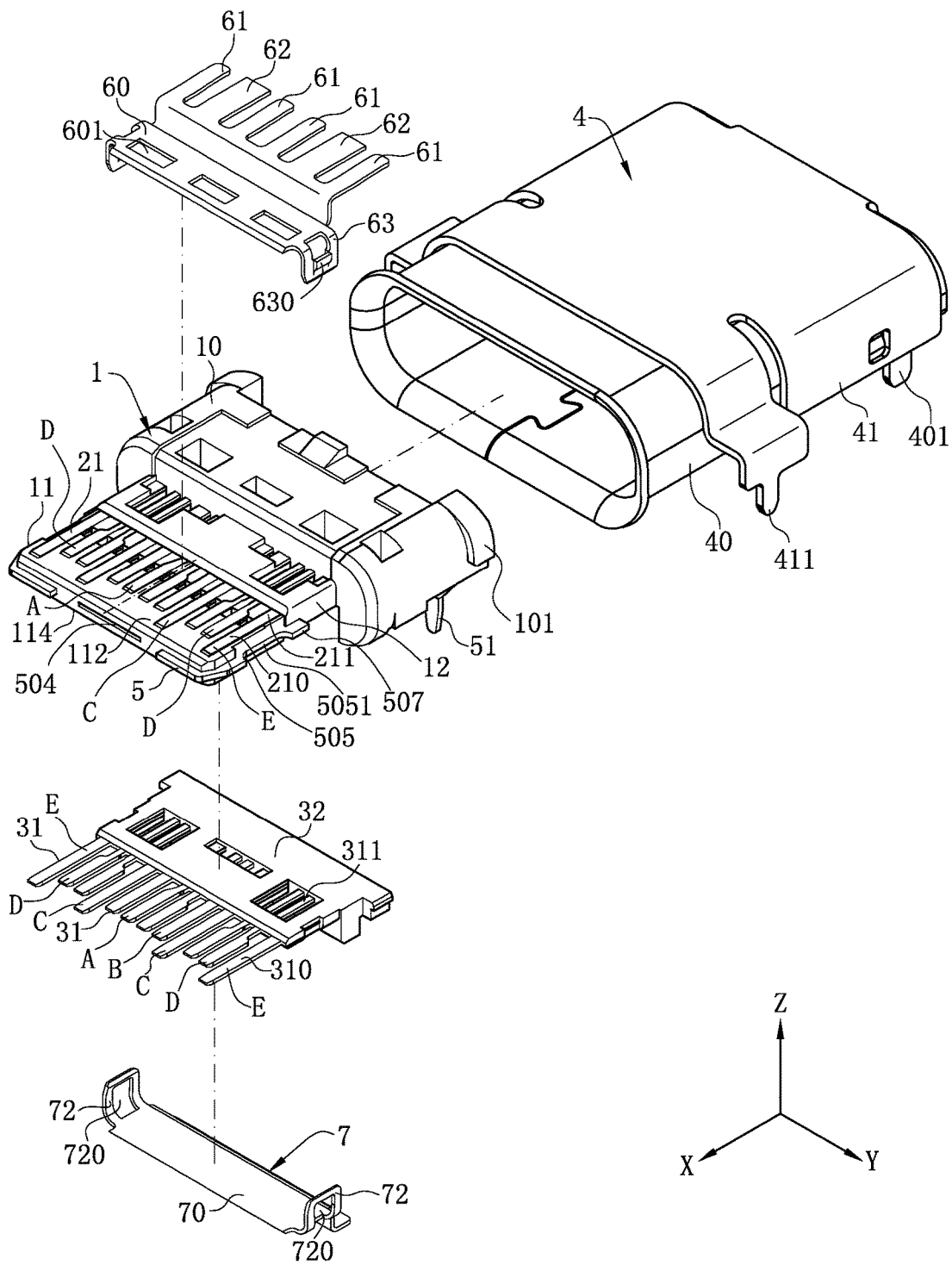
FIG. 3 is a schematic view in which a row of first terminals is fixed to an insulating body in FIG. 1.
Figure 8:
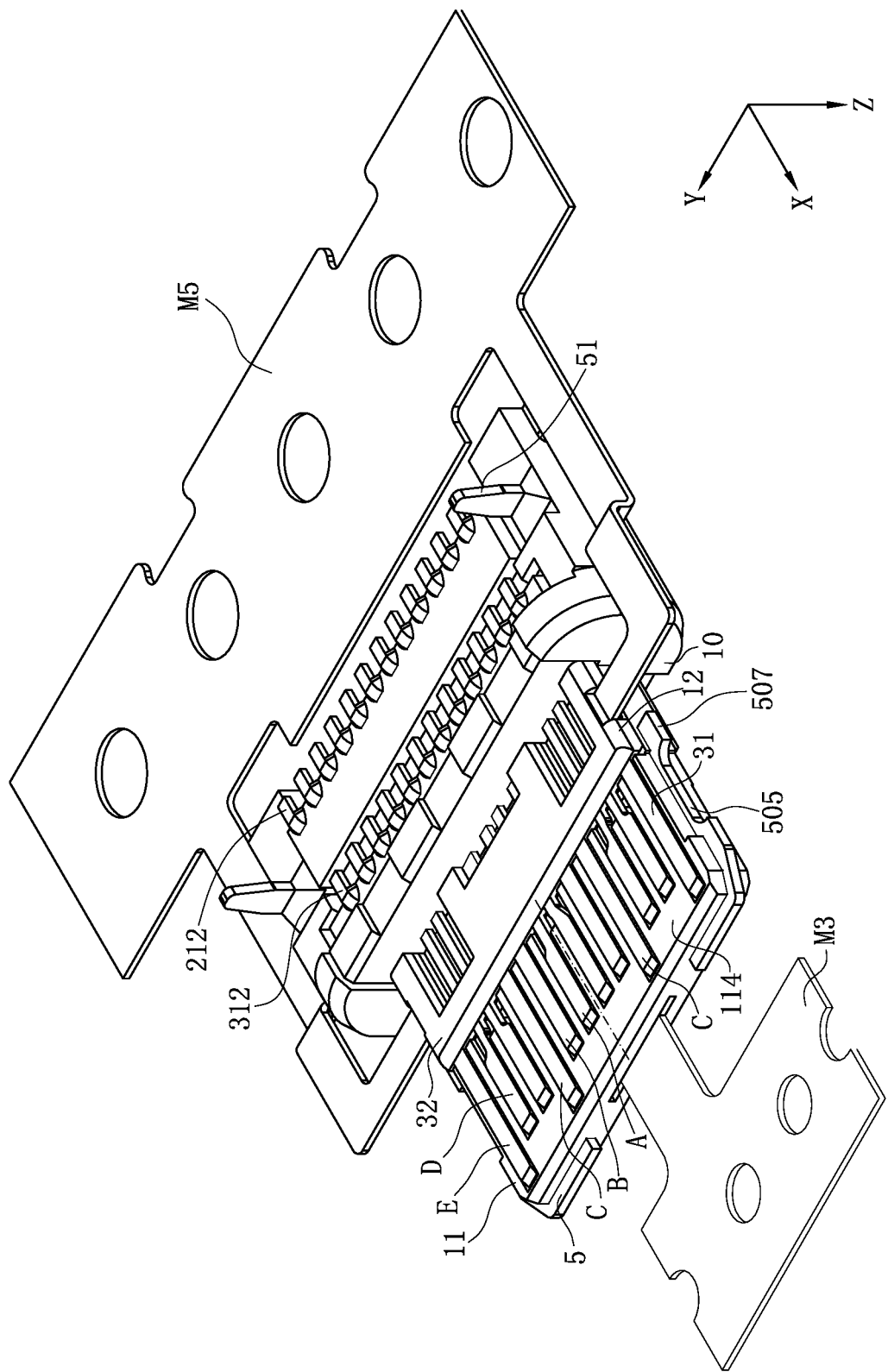
FIG. 8 is a schematic view in which the insulating body in FIG. 6 and the second terminal module in FIG. 7 are assembled together.

Referring to FIG. 1, FIG. 3 and FIG. 8, multiple terminals (unmarked) are arranged on the tongue 11 at intervals respectively to form at least one row, each terminal has a contact portion (unmarked) exposed from a surface of the tongue 11, and the surface of the tongue 11 includes the upper surface 112 and the lower surface 114. In this embodiment, the multiple terminals include a row of first terminals 21 and a row of second terminals 31 that are vertically and symmetrically arranged. Referring to FIG. 3 and FIG. 8, the first terminals 21 are arranged on the upper surface 112 of the tongue 11 to form an upper row, and the second terminals 31 are arranged on the lower surface 114 of the tongue 11 to form a lower row. The first terminals 21 in the upper row and the second terminals 31 in the lower row are vertically and symmetrically arranged. Each row of the row of first terminals 21 and the row of second terminals 31 includes high-speed terminals and non-high-speed terminals. Specifically, each row of the row of first terminals 21 and the row of second terminals 31 is sequentially from left to right as follows: a grounding terminal E, a pair of differential signal terminals D (high-speed terminals) for transmitting a USB 3.0 signal, a power supply terminal C, a reserved terminal B, a pair of USB 2.0 terminals A, a reserved terminal B, a power supply terminal C, a pair of differential signal terminals (high-speed terminals) D for transmitting a USB 3.0 signal, and a grounding terminal E. With an arrangement sequential order of each row of the first terminals 21 and the second terminals 31 as well as FIG. 3 and FIG. 8, it can be seen that each row of the first terminals 21 and the second terminals 31 are bilaterally and symmetrically arranged about the central line of the tongue 11 respectively, each of the first terminals 21 and the second terminals 31 comprise a pair of USB 2.0 terminals A and two pairs of differential signal terminals D respectively located at two transverse sides of the pair of USB 2.0 terminals, the USB 2.0 terminals A are located at middle positions of each row of the first terminals 21 and the second terminals 31, and the pair of USB 2.0 terminals A are closer to the central line of the tongue 11 as compared to other terminals. That is, the USB 2.0 terminals A are located at left and right sides of the central line of the tongue 11 respectively, and the distance between the USB 2.0 terminals A and the central line of the tongue 11 is smaller than the widths of the USB 2.0 terminals A. Since each row of the first terminals 21 and the second terminals 31 are arranged in the same sequential order and are bilaterally and symmetrically arranged along the central line of the tongue 11 respectively, each row of the first terminals 21 and each row of the second terminals 31 are one-to-one aligned along the vertical direction. That is, each row of the first terminals 21 and the second terminals 31 include a grounding terminal E located at an outer side of each pair of differential signal terminals D, and a power supply terminal C and a reserved terminal B located between each pair of differential signal terminals D and the USB 2.0 terminals A, the power supply terminal C being located closer to the differential signal terminals D as compared to the reserved terminal B.

The first terminal 21 and the second terminal 31 are both made of a metal plate material and stamped into a slender shape. Each first terminal 21 includes a first contact portion 210, a first connection portion 211 extending from the first contact portion 210, and a first soldering portion 212 bending from an end of the first connection portion 211. The first connection portion 211 includes a horizontal segment a 2110 extending horizontally backward from a back end of the first contact portion 210 and a vertical segment 2111 bending downward from the horizontal segment 2110. Multiple first terminals 21 are fixed into a row by using an insulating block 22, and the insulating block 22 and the row of first terminals 21 together form the first terminal module 2. The insulating block 22 is in a long strip shape, and wraps a part of each first connection portion 211 by insert molding. Specifically, the insulating block 22 wraps a part of the horizontal segment 2110. The first terminal module 2 as a whole is further insert molded in the insulating body 1, and a part of the first terminal 21 is insert molded in the insulating body 1. More specifically, the first contact portion 210 is exposed from the surface of the tongue 11. Referring to FIG. 3, each first contact portion 210 is exposed from the upper surface 112 of the tongue 11, and the first soldering portion 212 extends out of the base 10.

Likewise, each second terminal 31 includes a second contact portion 310, a second connection portion 311 extending from the second contact portion 310, and a second soldering portion 312 bending from an end of the second connection portion 311. The second connection portion 311 includes a horizontal segment (not shown) extending backward horizontally from a back end of the second contact portion 310 and a vertical segment (not shown) bending downward from the horizontal segment (not shown). Multiple second terminals 31 are fixed into a row using a plastic block 32, and the plastic block 32 and the row of second terminals 31 together form the second terminal module 3. The plastic block 32 is in a long strip shape, and wraps each second connection portion 311 by insert molding. Specifically, the plastic block 32 almost wraps the entire horizontal segment and vertical segment. Referring to FIG. 8, each second contact portion 310 is exposed from the lower surface 114 of the tongue 11. The contact portions of the multiple terminals include the first contact portion 210 and the second contact portion 310.

Figure 6:
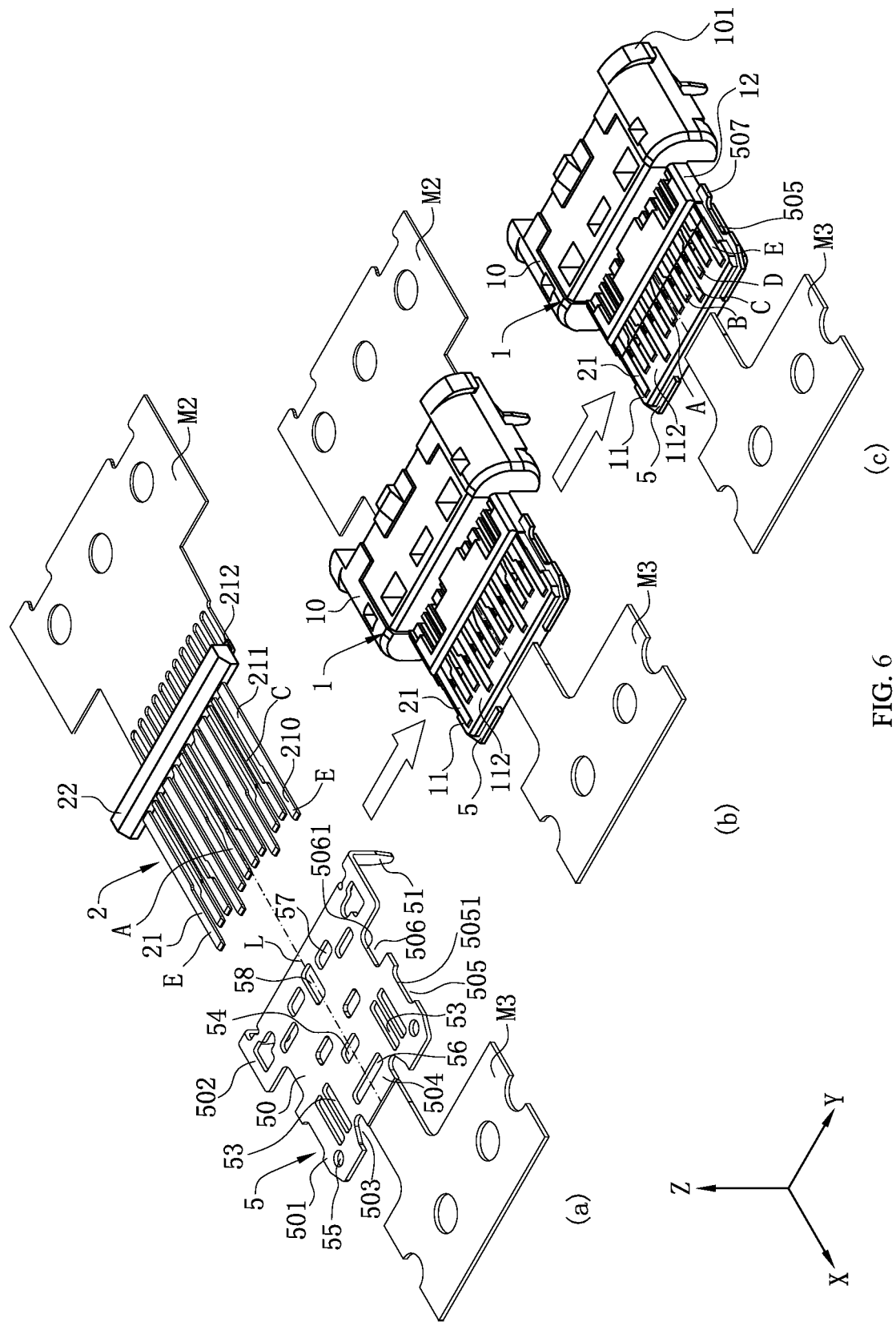
FIG. 6 is a flowchart of insert-molding the first terminal module and a middle shielding sheet together to the insulating body according to one embodiment of the present invention.

The electrical connector of this embodiment further includes a middle shielding sheet 5. The middle shielding sheet 5 and the first terminal module 2 are together insert molded in the insulating body 1, and the second terminal module 3 is assembled to the lower surface of the insulating body 1 from bottom upward from the bottom of the insulating body 1, and is tightly locked to the lower surface of the insulating body 1. As shown in FIG. 6 and FIG. 8, the middle shielding sheet 5 is insert molded in the tongue 11 and partially embedded into the step portion 12 and the base 10.

The middle shielding sheet 5 is located between the first terminal module 2 and the second terminal module 3 in the vertical direction.

The middle shielding sheet 5 is made of a metal material, and includes a main body 50 which is rectangular along the front-rear direction, and two soldering pins 51 separately bending downward and extending from a back end of the main body 50. The soldering pins 51 are used for conducting a grounding path in a circuit board (not shown). A bending portion 52 further bends downward and extends from the center of the back end of the main body 50, and the bending portion 52 is located between the two soldering pins 51, and is at a distance from the soldering pins 51. The main body 50 is insert molded into the insulating body 1, the main body 50 of the middle shielding sheet 5 is located between a row of first contact portions 210 and a row of second contact portions 310, and also extends to a position between the first connection portion 211 and the second connection portion 311, and the bending portion 52 is located between the vertical segment 2111 of the first terminal 21 and the vertical segment of the second terminal 31. The soldering pins 51 are exposed from the insulating body 1. Specifically, the soldering pins 51 extend out of the base 10, and are used for being soldered to the circuit board and conducting an interference signal to the grounding path on the circuit board.

In such configuration, the middle shielding sheet 5 can fully shield an interference signal between the first terminals 21 and the second terminals 31, so as to alleviate crosstalk in a signal transmission process.

As shown in FIG. 1, FIG. 3 and FIG. 8, since the middle shielding sheet 5 is insert molded in the tongue 11 and positioned between the first terminal 21 and the second terminal 31, the configuration of the middle shielding sheet 5 has a close impact to overall transmission of a high-frequency electronic signal through the electrical connector. The middle shielding sheet 5 has a central line L along the front-rear direction. Referring to FIG. 2, the central line L coincides with the central line of the tongue 11, and the middle shielding sheet 5 is provided with a first middle hole 54 across the central line L. That is, the first middle hole 54 passes across the central line of the tongue 11. The USB 2.0 terminals A are located at two sides of the central line of the tongue 11, and the distance between the USB 2.0 terminals A and the central line of the tongue 11 is smaller than the widths of the USB 2.0 terminals A. Thus, as shown in FIG. 1, the width of the first middle hole 54 along the transverse direction is greater than that of at least one USB 2.0 terminal A, so the first middle hole 54 and the USB 2.0 terminals A correspond to each other along the vertical direction. That is, the first middle hole 54 is correspondingly located between the USB 2.0 terminals in the upper and lower rows. The middle shielding sheet 5 is provided with a plurality of first holes 53, with at least one first hole 53 being respectively provided at two transverse sides of the central line L. In this embodiment, the middle shielding sheet 5 is provided with four first holes 53, and two of the four first holes 53 are respectively provided at each of two sides of the central line L to penetrate therethrough. The four first holes 53 are arranged in a row at intervals along the transverse direction, and the four first holes 53 are of the same structure, with each of the first holes 53 being a slender hole. Referring to FIG. 1 and FIG. 3, the differential signal terminals D are located closer to the first holes 53 as compared to other terminals. A front edge of the first middle hole 54 extends forward beyond a rear edge of the first hole 53, and the length of the first middle hole 54 along the front-rear direction is shorter than that of the first hole 53 along the front-rear direction. The first middle hole 54 is correspondingly located between the USB 2.0 terminals in the upper and lower rows, such that the USB 2.0 terminals A are conveniently aligned during insert molding with the tongue 11. The differential signal terminals D are closer to the first holes 53 as compared to other terminals, such that the differential signal terminals D are conveniently positioned. The front edge of the first middle hole 54 extends forward beyond the rear edge of the first hole 53, and the length of the first middle hole 54 along the front-rear direction is shorter than that of the first hole 53 along the front-rear direction. In this case, the strength of the middle shielding sheet 5 is enhanced, and the middle shielding sheet 5 has a better shielding effect on the USB 2.0 terminals A, thus effectively alleviating crosstalk for the differential signal terminals D caused by the USB 2.0 terminals A during signal transmission, and ensuring the high-frequency performance of the electrical connector. The front edge of the first middle hole 54 extends forward beyond the rear edge of the first hole 53, that is, viewed from a projection in the transverse direction, the first middle hole 54 and the first hole 53 are partially overlapped, thus avoiding a too-narrow grounding path of the middle shielding sheet 5 due to an over-large spacing between the first middle hole 54 and the first hole 53, and ensuring that the middle shielding sheet 5 has a good grounding effect. The reserved terminal B is located closer to the first middle hole 54 as compared to the power supply terminal C.

As shown in FIG. 1 and FIG. 2, the first middle hole 54 is located between the two first holes 53 along the transverse direction, the length of the first hole 53 along the front-rear direction is greater than the width thereof along the transverse direction, and the width of the first middle hole 54 along the transverse direction is greater than the length thereof along the front-rear direction. Such setting aids in stress balance of the middle shielding sheet 5, prolongs the service life thereof, and ensures the strength of the middle shielding sheet 5. In this embodiment, the front edge of the first middle hole 54 is located at a rear side of a front edge of the first hole 53.

As shown in FIG. 1 and FIG. 2, the first middle hole 54 is located between the two first holes 53 along the transverse direction. The length of the first hole 53 along the front-rear direction is greater than the width thereof along the transverse direction, and the width of the first middle hole 54 along the transverse direction is greater than the length thereof along the front-rear direction. Such configuration aids in stress balance of the middle shielding sheet 5, prolongs the service life thereof, and ensures the strength of the middle shielding sheet 5. In this embodiment, the front edge of the first middle hole 54 is located at a rear side of a front edge of the first hole 53.

As shown in FIG. 1 and FIG. 2, the middle shielding sheet 5 is provided with a plurality of second holes 57, with at least one second hole 57 respectively provided at two transverse sides of the central line L, and the second holes 57 are located closer to the central line L as compared to the first holes 53. The two second holes 57 are arranged in a row along the transverse direction, and viewed from a projection in the transverse direction, the first middle hole 54 is located between the first hole 53 and the second hole 57. The configuration of the first middle hole 54, the first hole 53 and the second hole 57 makes it convenient for a positioning pin to clamp and position the first terminals 21 and the second terminals 31, and prevents the first terminals 21 and the second terminals 31 from being obliquely punched by plastics. The middle shielding sheet 5 is provided with a second middle hole 56 and a third middle hole 58 at front and rear sides of the first middle hole 54 respectively, and the second middle hole 56 and the third middle hole 58 respectively pass across the central line L. The second middle hole 56 is located between the front edge of the middle shielding sheet 5 and the front edge of the first middle hole 54, and the third middle hole 58 is located behind the first middle hole 54. The second middle hole 56 is located closer to the first contact portion 210 and the second contact portion 310 as compared to the third middle hole 57, and the length of the second middle hole 56 along the front-rear direction is smaller than that of the third middle hole 58 along the front-rear direction, such that the middle shielding sheet 5 has a better shielding effect on the first contact portion 210 and the second contact portion 310. Viewed from a projection in the front-rear direction, the projections along the front-rear direction of the second middle hole 56, the third middle hole 58 and the first middle hole 54 are partially overlapped. The configuration of the second middle hole 56, the third middle hole 58 and the first middle hole 54 achieves a better positioning effect of the USB 2.0 terminal A during insert molding, and avoids displacement of the USB 2.0 terminal A during insert molding.

Figure 4:
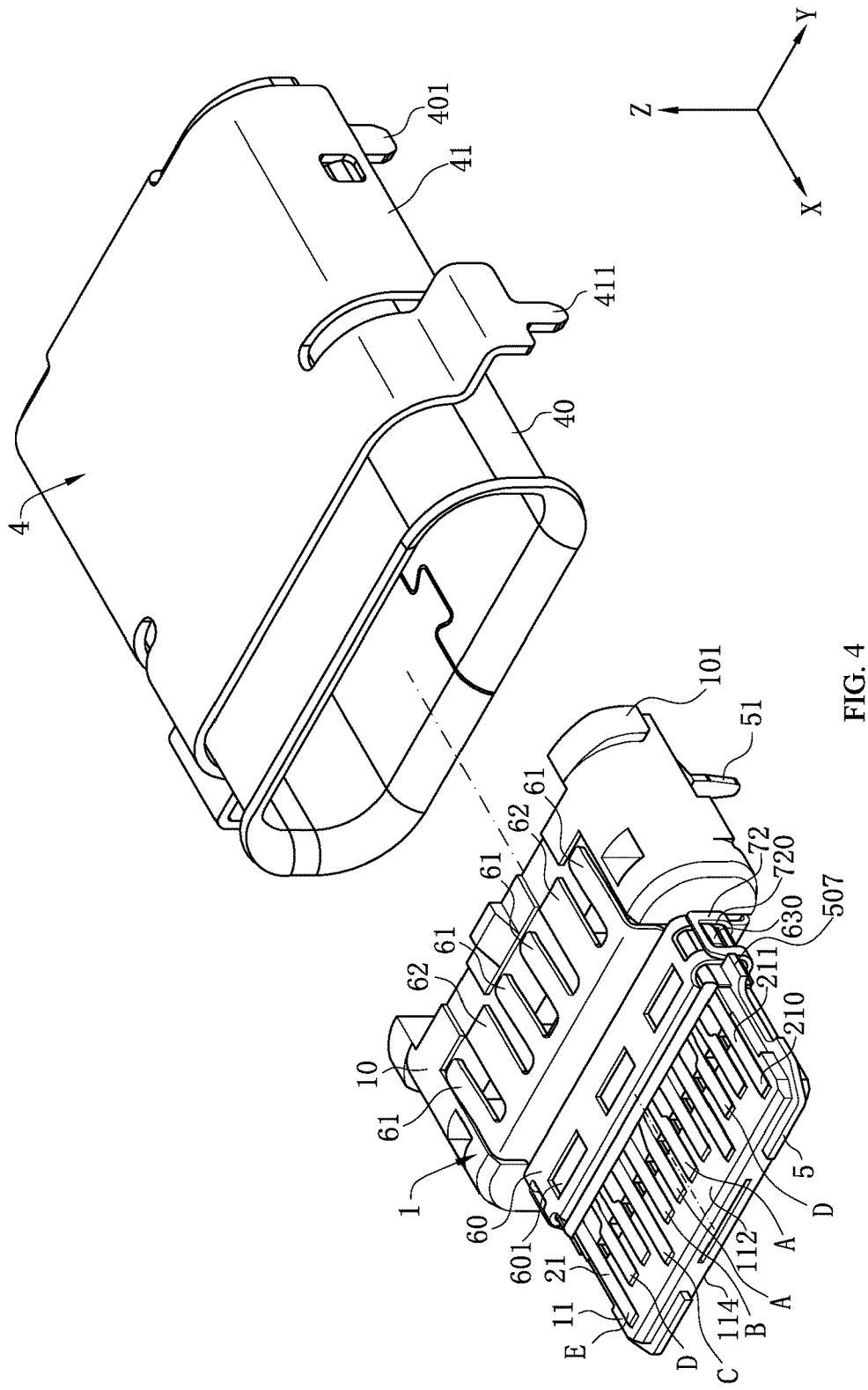
FIG. 4 is a schematic view in which a row of second terminals is assembled to the insulating body, and upper and lower shielding sheets are fixed to the insulating body in FIG. 3.

As shown in FIG. 1, FIG. 4 and FIG. 8, in the vertical direction, the middle shielding sheet 5 is located closer to the middle position of the tongue 11 as compared to the first contact portion 210 and the second contact portion 310 in the upper row and the lower row. Two recesses 503 are provided at intervals backwards from the front edge of the middle shielding sheet 5. The power supply terminal C in the upper row is partially located right above the recesses 503, and the power supply terminal C in the lower row is partially located right below the recesses 503. The two recesses 503 are located at two opposite sides of the central line L respectively, and each recess 503 is located closer to the central line L as compared to each first hole 53. A spacer portion 504 is formed between the two recesses 503 of the middle shielding sheet 5, and the spacer portion 504 is embedded into the tongue 11. The spacer portion 504 stretches across the central line L, and the first middle hole 54 is located right behind the spacer portion 504. The USB 2.0 terminals A are located between extending lines of two opposite side edges of the spacer portion 504, and each pair of differential signal terminals D is correspondingly located between each of the recesses 503 and the side edge of the middle shielding sheet 5. The two recesses 503 are axially and symmetrically arranged about the central line L serving as an axis of symmetry, and each of the second holes 57 is further away from the spacer portion 504 as compared to the first middle hole 54. In the transverse direction perpendicular to the front-rear direction and the vertical direction, the middle shielding sheet 5 is provided with a through-hole 55 between each recess 503 and each side edge of the middle shielding sheet 5, and the through-hole 55 is used for allowing the positioning pin for injection molding to position the first terminal 21 and the second terminal 31, thus preventing the first terminal 21 and the second terminal 31 from being obliquely punched by flowing plastics. A front edge of the spacer portion 504 extends forward beyond a front edge of the through-hole 55. The spacer portion 504 is embedded into the tongue 11, so the contact area between the middle shielding sheet 5 and the tongue 11 is increased to enhance the bonding force between the middle shielding sheet 5 and the tongue 11, and the strength of a front end of the tongue 11 is improved to ensure that the electrical connector has better structural stability. In this embodiment, a through-hole 55 is provided between each recess 503 and each side edge of the middle shielding sheet 5 respectively. That is, there are two through-holes 55. In the transverse direction, the width of each recess 503 is smaller than that of the spacer portion 504, thus further enhancing the strength of the tongue 11. The first holes 53 are located between the through-holes 55 and the recesses 503 along the transverse direction. In the front-rear direction, the front edge of each through-hole 55 extends forward beyond the rear edge of each recess 503. In the transverse direction, the distance between each through-hole 55 and the side edge of the middle shielding sheet 5 is smaller than the distance between each through-hole 55 and each recess 503. The middle shielding sheet 5 is provided with the second middle hole 56 right behind the spacer portion 504. A first notch 505 and a second notch 506 are provided from each of two side edges of the middle shielding sheet 5 along the transverse direction respectively. The first notch 505 has a first inner side edge 5051, the second notch 506 has a second inner side edge 5061, and the first inner side edge 5051 is located closer to the side edge of the middle shielding sheet 5 as compared to the second inner side edge 5061. That is, the second inner side edge 5061 is located closer to the central line L as compared to the first inner side edge 5051. The middle shielding sheet 5 is provided with a protruding portion 507 between the first notch 505 and the second notch 506. The first inner side edge 5051 protrudes out of a side surface of the tongue 11 along the transverse direction. The protruding portion 507 partially protrudes out of a side surface of the step portion 12 along the transverse direction, and the protruding portion 507 is used for allowing upper and lower mold cores of an injection mold to clamp and position. The thickness of the step portion 12 is greater than that of the tongue 11, so protrusion of the protruding portion 507 out of the step portion 12 more aids in sealing with glue, thus ensuring that all parts of the insulating body 1 are uniformly sealed with glue.

As shown in FIG. 1, FIG. 2 and FIG. 4, the main body 50 has a front section 501 located in the tongue 11, and a rear section 502 extending backward from the front section 501 is located in the base 11. The width of the rear section 502 is greater than that of the front section 501 in the transverse direction. The front section 501 is provided with the recesses 503, the spacer portion 504, the through-holes 55, the first middle hole 54 and the first holes 53, and the second holes 57 and the third middle hole 58 are provided on the rear section 502, thus ensuring the strength consistency of all parts of the middle shielding sheet 5.

As shown in FIG. 3 and FIG. 4, the electrical connector of this embodiment further includes an upper shielding sheet 6, a lower shielding sheet 7, and a shielding case 4 sleeving the insulating body 1 from back to front. The upper shielding sheet 6 and the lower shielding sheet 7 are respectively laminated to an upper surface and a lower surface of the insulating body 1, and the upper shielding sheet 6 and the lower shielding sheet 7 are assembled and connected to each other. Specifically, the upper shielding sheet 6 is laminated to the upper surface 112 of the tongue 11. The upper shielding sheet 6 includes a flat plate portion 60 covering the rear segment of the upper surface 112 of the tongue 11. Four elastic arms 61 extend backward from the flat plate portion 60. The elastic arms 61 are located above the base 10 and urge against the shielding case 4 upward elastically. Moreover, two material connection portions 62 further extend backward from the flat plate portion 60, so as to provide convenience for assembly of the upper shielding sheet 6. Multiple depressed portions 601 are depressed downward from the flat plate portion 60 and used for snap-fitting a grounding elastic sheet (not shown) in a matting connector (not shown). A snap-fit portion 63 bends downward from each of two ends of the flat plate portion 60 and covers the side edge of the tongue 11, and a protruding block 630 protrudes from the snap-fit portion 63 toward the outside. The lower shielding sheet 7 is laminated to the lower surface of the plastic block 32.

The lower shielding sheet 7 includes a plate-shaped portion 70 covering the rear segment of the lower side of the tongue 11, and an urging portion 71 extending backward from the plate-shaped portion 70. The urging portion 71 is located below the base 10 and urges against the shielding case 4. Likewise, multiple depressed portions 701 are depressed upward from the plate-shaped portion 70 and used for snap-fitting a grounding elastic sheet (not shown) in a mating connector (not shown). A buckling portion 72 bends upward from each of two ends of the plate-shaped portion 70 and covers the side edge of the tongue 11. The buckling portion 72 is provided with a through-hole 720 correspondingly snap-fitting the protruding block 630 on the upper shielding sheet 6.

To further ensure contact between the lower shielding sheet 7 and the shielding case 4, the shielding case 4 and the lower shielding sheet 7 are connected by spot welding. As shown in FIG. 1 and FIG. 2, the shielding case 4 includes an inner case 40 wrapping the insulating body 1 and an outer case 41 covering the inner case 40. At least one first connection pin 401 extends downward from the inner case 40 along the vertical direction. At least one second connection pin 411 extends downward from the outer case 41 along the vertical direction, and the second connection pin 411 is located in front of the first connection pin 401. In this embodiment, the inner case 40 has two first connection pins 401, the outer case 41 has two second connection pins 411, and the first connection pins 401 and the second connection pins 411 are arranged in tandem. The arc-shaped block 101 matches a rear end of the inner case 40, and viewed from a projection in the front-rear direction, the spacer portion 504 is located between the two arc-shaped blocks 101.

Figure 5:
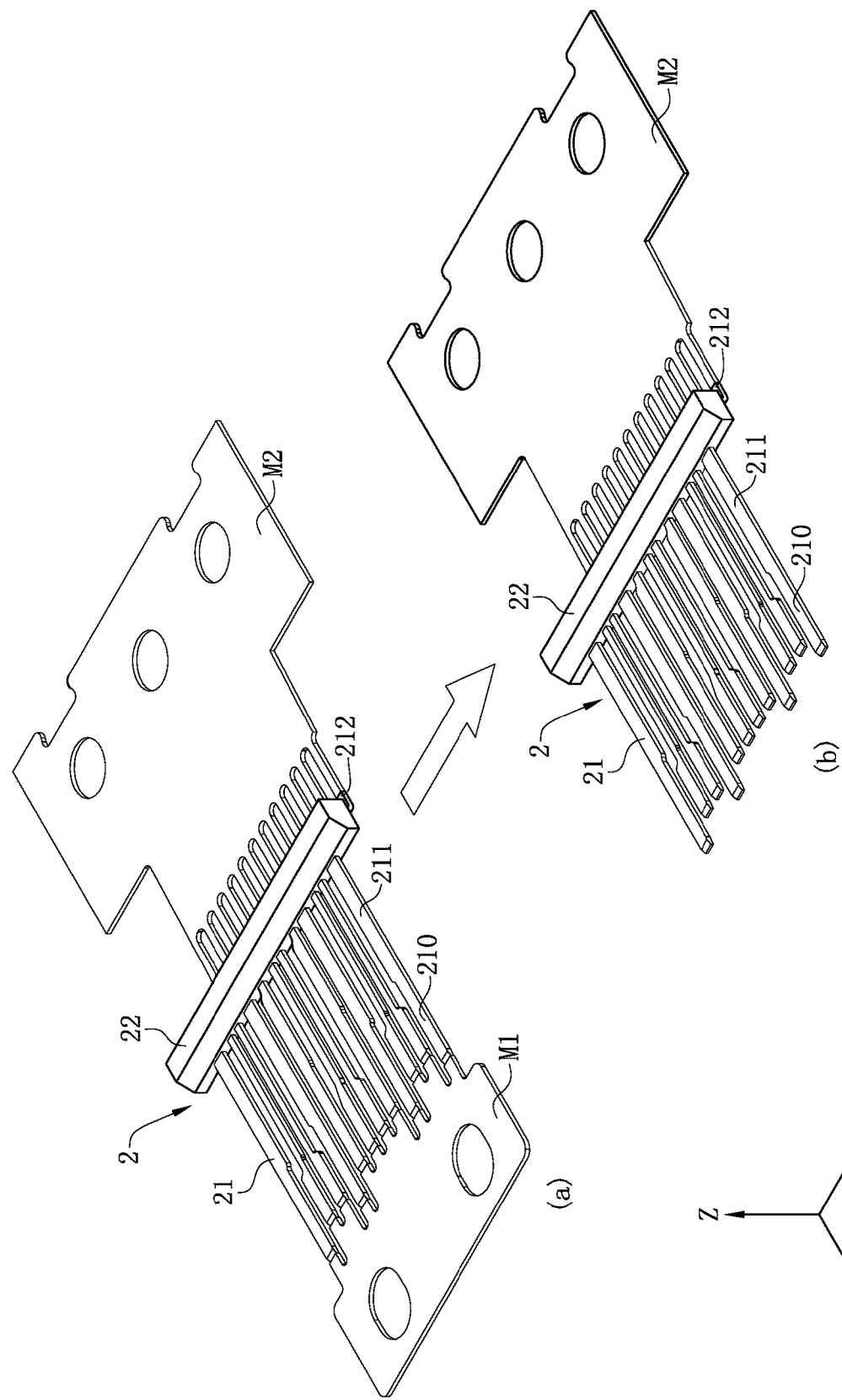
FIG. 5 is a flowchart of molding a first terminal module according to one embodiment of the present invention.

Referring to FIG. 5 to FIG. 8, a method for molding an electrical connector according to certain embodiments of the present invention includes the following steps:

Step S1: providing a row of first terminals 21, where each of the first terminals 21 includes a first contact portion 210, a first connection portion 211 extending from the first contact portion 210, and a first soldering portion 212 bending from the first connection portion 211; and integrally wrapping an insulating block 22 on the first connection portions 211 by insert molding, where the insulating block 22 and the row of first terminals 21 together form a first terminal module 2. As shown in FIG. 5 (*a*), a front end of each first contact portion 210 is connected to a first strip M1, and a back end of each first soldering portion 212 is connected to a second strip M2.

Then, perform step S11: separating the first strip M1 from the front ends of the first contact portions 210, so that the front ends of the first contact portions 210 become free ends, as shown in FIG. 5 (*b*).

Then, perform step S2: providing a middle shielding sheet 5, where the middle shielding sheet 5 includes a plate-shaped main body 50 and two soldering pins 51 extending from a back end of the main body 50, and a front end of the main body 50 is connected to a third strip M3, as shown in FIG. 6 (*a*).

Then, perform step S21: moving the row of first terminals 21 using the second strip M2, moving the middle shielding sheet 5 using the third strip M3, and positioning the row of first terminals 21 above the middle shielding sheet 5.

Then, perform step S3: integrally wrapping an insulating body 1 around the middle shielding sheet 5 and the first terminal module 2 by insert molding, where the insulating body 1 includes a base 10 and a tongue 11 extending from the base 10, the main body 50 is insert molded in the tongue 11 and the base 10, a part of each first terminal 21 is insert molded in the insulating body 1, the first contact portions 210 are exposed from a surface of the tongue 11, and the first soldering portions 212 and the soldering pins 51 extend out of the base 10. The structure is specifically shown in FIG. 6 (*b*). In this process, the insulating block 22 and the insulating body 1 are fused and bonded.

Then, perform step S31: separating the second strip M2 from the back ends of the first soldering portions 212, as shown in FIG. 6 (*c*).

Figure 7:
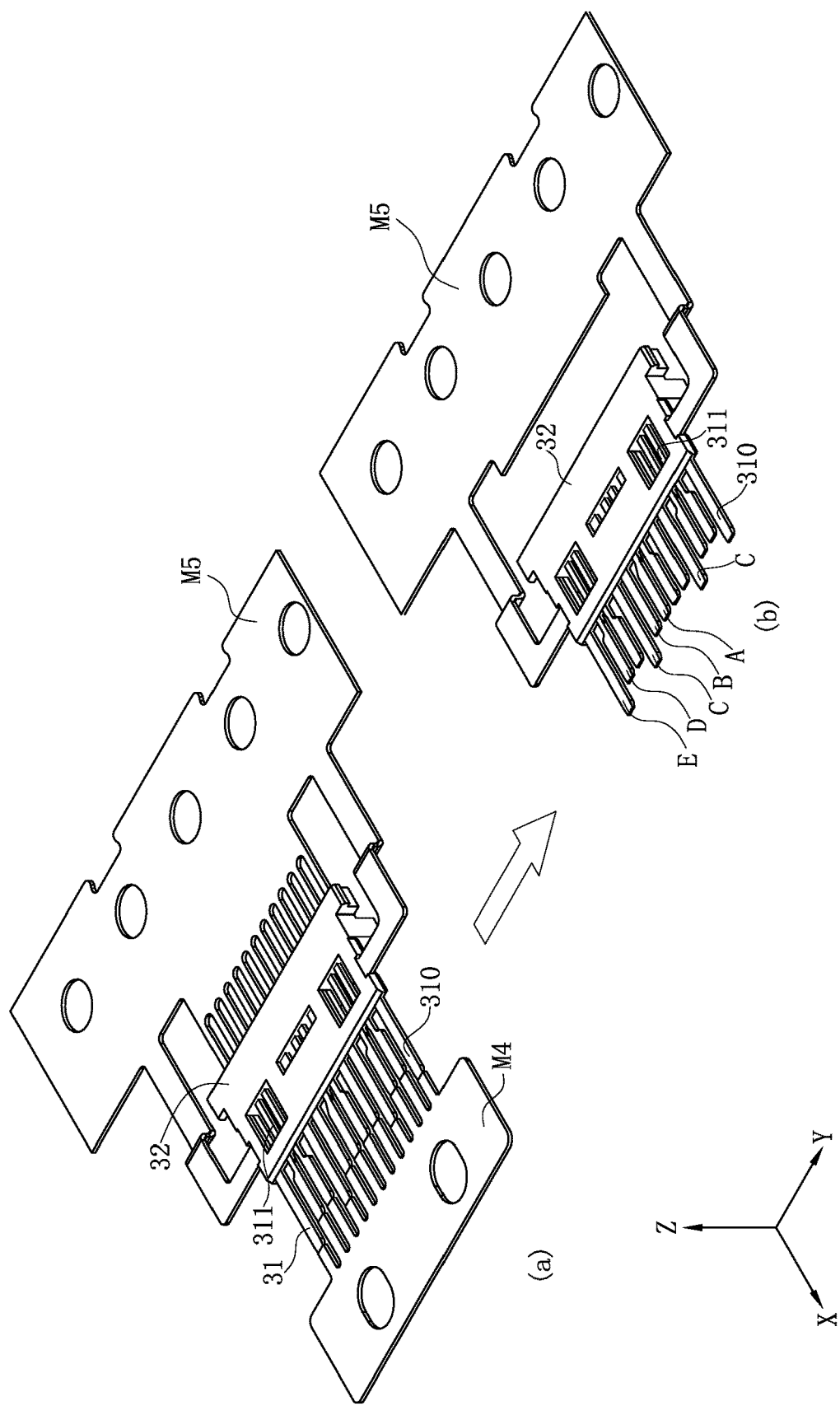
FIG. 7 is a flowchart of molding a second terminal module according to one embodiment of the present invention.

In certain embodiments, the method of the present invention further includes step S4: providing a row of second terminals 31, where each of the second terminals 31 includes a second contact portion 310, a second soldering portion 312 and a second connection portion 311 connecting the second contact portion 310 and the second soldering portion 312; and integrally wrapping a plastic block 32 on the second connection portion 311 by insert molding, where the plastic block 32 and the row of second terminals 31 together form a second terminal module 3. As shown in FIG. 7 (*a*), a front end of each second contact portion 310 is connected to a fourth strip M4, a back end of each second soldering portion 312 is connected to a fifth strip M5, and side edges of two second terminals 31 located at the outermost side of the row of second terminals 31 are separately connected to the fifth strip M5.

After step S4, perform step S41: separating the fourth strip M4 from the front ends of the second contact portions 310, and separating the soldering portions 312 of the second terminals 31 from the fifth strip M5, so that front ends and back ends of the second terminals 31 become free ends, and the side edges of the two second terminals 31 at the outermost side are kept connected to the fifth strip M5, as shown in FIG. 7 (*b*). It should be noted that, the process (including step S4 and step S41) shown in FIG. 7 is performed using an additional mold, and therefore can be performed simultaneously with steps shown in FIG. 5 and FIG. 6 or the process and the steps are not performed in sequence.

After step S41 is performed to obtain the structure shown in FIG. 7 (*b*), perform step S5: driving the second terminal module 3, that is, the structure shown in FIG. 7 (*b*), by using the fifth strip M5, and driving the insulating body 1 formed in step S31, that is, the structure shown in FIG. 6 (*c*), by using the third strip M3, so as to assemble and fix the second terminal module 3 to the insulating body 1, to obtain the structure shown in FIG. 8.

Then, perform step S6: separately removing the third strip M3 and the fifth strip M5.

Then, perform step S7: assembling an upper shielding sheet 6 and a lower shielding sheet 7 to an upper surface and a lower surface of the insulating body 1 respectively; and finally, sleeving the insulating body 1 with a shielding case 4 from back to front, and conducting the shielding case 4 to the upper shielding sheet 6 and the lower shielding sheet 7.

The molding method according to certain embodiments of the present invention, among other things, has the following beneficial advantages:

1. Two recesses 503 are provided at intervals backwards from a front edge of the middle shielding sheet 5, and a spacer portion 504 is formed between the two recesses 503 of the middle shielding sheet 5. In the transverse direction perpendicular to the front-rear direction and the vertical direction, the middle shielding sheet 5 is provided with a through-hole 55 between at least one recess 503 and the side edge of the middle shielding sheet 5, and the through-hole 55 is used for allowing the positioning pin for injection molding to position the first terminal 21 and the second terminal 31, thus preventing the first terminal 21 and the second terminal 31 from being obliquely punched by flowing plastics. A front edge of the spacer portion 504 extends forward beyond a front edge of the through-hole 55. The spacer portion 504 is embedded into the tongue 11. Thus, the contact area between the middle shielding sheet 5 and the tongue 11 is increased to enhance the bonding force between the middle shielding sheet 5 and the tongue 11, and the strength of a front end of the tongue 11 is improved to ensure that the electrical connector has better structural stability.

2. The front edge of the first middle hole 54 extends forward beyond the rear edge of the first hole 53, that is, viewed from a projection in the transverse direction, the first middle hole 54 and the first hole 53 are partially overlapped, thus avoiding a too-narrow grounding path of the middle shielding sheet 5 due to an over-large spacing between the first middle hole 54 and the first hole 53, and ensuring that the middle shielding sheet 5 has a good grounding effect.

3. The width of each recess 503 is smaller than that of the spacer portion 504, thus further enhancing the strength of the tongue 11.

4. The first middle hole 54 is correspondingly located between the upper row of USB 2.0 terminals A and the lower row of USB 2.0 terminals A, such that the USB 2.0 terminals A are conveniently aligned during insert molding with the tongue 11. The middle shielding sheet 5 is provided with the first hole 53 at two transverse sides of the central line L respectively. The front edge of the first middle hole 54 extends forward beyond the rear edge of the first holes 53, and the length of the first middle hole 54 along the front-rear direction is smaller than that of the first hole 53 along the front-rear direction. In this case, the self-strength of the middle shielding sheet 5 is enhanced, and the middle shielding sheet 5 has a better shielding effect on the USB 2.0 terminals A, thus effectively alleviating crosstalk for the differential signal terminals D caused by the USB 2.0 terminals A during signal transmission, and ensuring the high-frequency performance of the electrical connector.

5. In certain embodiments of the present invention, first connection portions 211 of a row of first terminals 21 are first insert molded in an insulating block 22 to form a first terminal module 2, and then the first terminal module 2 and a middle shielding sheet 5 are insert molded together, so that the row of first terminals 21 is fixed as a whole. The insulating block 22 plays a role of holding the first terminal 21, free ends of the first terminals 21 can be prevented from warping or deflecting, the true position of the terminals is good, the risk of mutual contact of two adjacent first terminals 21 can be reduced. This also provides convenience for placing the entire row of first terminals 21 into a mold cavity when the first terminal module 2 and the middle shielding sheet 5 are insert molded together subsequently, so as to avoid that the terminal is damaged after being pressed or a mold is damaged when the first terminals 21 are clamped and positioned by positioning pin. Likewise, a row of second terminals 31 is insert molded in a plastic block 32, and free ends of the second terminals 31 can also be prevented from warping or deflecting, thereby preventing two adjacent second terminals 31 from contacting each other, so as to ensure the true position of the terminal.

6. In certain embodiments of the present invention, a molding manner includes insert molding both the middle shielding sheet 5 and a row of first terminals 21 into the tongue 11, and assembling a row of second terminals 31 to the lower surface of the insulating body 1. Compared with a manner in which both an upper row of terminals and a lower row of terminals are fixed to the tongue 11 in an assembly manner, the molding manner of the present invention can ensure the strength of the tongue 11 (because the tongue 11 needs to be thinned or slotted when the upper and lower terminal modules and the tongue 11 are assembled). Compared with a manner in which both an upper row of terminals and a lower row of terminals are fixed to the tongue 11 in an insert molding manner, the molding manner of the present invention can ensure that the terminals are stably held and are not damaged on the tongue 11 (because two molds are required to position an upper row of terminals and a lower row of terminals when the upper and lower terminal modules and the tongue 11 are bonded in an insert molding manner, and the molds easily damage the terminals after pressing in a second-time molding process). Meanwhile, production costs are reduced in the molding manner of the present invention.

7. In the electrical connector formed in the present invention, the insulating body 1 to which the first terminal module 2 is held and the plastic block 32 to which the second terminal module 3 is held are bonded together in an assembly manner. For these two elements bonded in an assembly and locking manner, the upper shielding sheet 6 is laminated to the upper surface of the insulating body 1, the lower shielding sheet 7 is laminated to the lower surface of the plastic block 32, and the upper shielding sheet 6 and the lower shielding sheet 7 are in a snap-fit connection to each other, so that the insulating body 1 and the plastic block 32 can be firmly fixed together, and are not easily separated.

8. The depressed portions 601 and 701 on the upper shielding sheet 6 and the lower shielding sheet 7 connect the electrical connector and the grounding line of the mating connector as a whole to implement the shielding function thereof, and can further prevent the mating connector from withdrawing from the insertion space of the electrical connector.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments are chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An electrical connector, comprising:
   an insulating body, having a base and a tongue extending forward from the base;
   a plurality of terminals arranged on the tongue at intervals respectively to form at least one row, each of the terminals having a contact portion exposed from a surface of the tongue, wherein the terminals comprise a plurality of first terminals arranged on an upper surface of the tongue and a plurality of second terminals arranged on a lower surface of the tongue to form an upper row and a lower row; and
   a middle shielding sheet, insert molded in the tongue, the middle shielding sheet being located closer to a middle position of the tongue than the contact portion in a vertical direction, wherein two recesses are provided backward from a front edge of the middle shielding sheet, a spacer portion is formed between the two recesses of the middle shielding sheet, the spacer portion is embedded into the tongue, the middle shielding sheet is provided with a through-hole between at least one of the recesses and a side edge of the middle shielding sheet in a transverse direction perpendicular to a front-rear direction and the vertical direction, and a front edge of the spacer portion extends forward beyond a front edge of the through-hole,
   wherein each of the first terminals and the second terminals comprise a pair of universal serial bus (USB) 2.0 terminals and two pairs of differential signal terminals respectively located at two transverse sides of the pair of USB 2.0 terminals, the USB 2.0 terminals are located between extending lines of two opposite side edges of the spacer portion, and each pair of differential signal terminals is correspondingly located between each of the recesses and the side edge of the middle shielding sheet; and
   wherein the middle shielding sheet is provided with a first middle hole across a central line thereof along the front-rear direction, a width of the first middle hole along the transverse direction is greater than that of at least one of the USB 2.0 terminals, the first middle hole is correspondingly located between the USB 2.0 terminals in the upper row and the USB 2.0 terminals in the lower row, the middle shielding sheet is provided with a plurality of first holes, at least one of the first holes is provided respectively at each of two transverse sides of the central line, a front edge of the first middle hole extends forward beyond a rear edge of the first holes, and the length of the first middle hole along the front-rear direction is shorter than a length of each of the first holes along the front-rear direction.

2. The electrical connector of claim 1, wherein a width of each of the recesses is smaller than that of the spacer portion in the transverse direction.

3. The electrical connector of claim 1, wherein the front edge of the through-hole extends forward beyond a rear edge of the recesses.

4. The electrical connector of claim 1, wherein a distance between the through-hole and the side edge of the middle shielding sheet is smaller than a distance between the through-hole and the corresponding recess in the transverse direction.

5. The electrical connector of claim 1, wherein a first notch and a second notch are provided respectively from the side edge of the middle shielding sheet along the transverse direction, the first notch has a first inner side edge, the second notch has a second inner side edge, and the first inner side edge is located closer to the side edge of the middle shielding sheet than the second inner side edge.

6. The electrical connector of claim 5, wherein:
the insulating body is provided with a step portion between the tongue and the base, a thickness of the step portion is greater than that of the tongue and smaller than that of the base;
the middle shielding sheet is partially embedded into the step portion, and is provided with a protruding portion between the first notch and the second notch;
the first inner side edge protrudes out of a side surface of the tongue along the transverse direction; and
the protruding portion partially protrudes out of a side surface of the step portion along the transverse direction.

7. The electrical connector of claim 1, wherein the plurality of first terminals in the upper row and the plurality of second terminals in the lower row are vertically and symmetrically arranged, each of the plurality of first terminals and the plurality of second terminals comprise a grounding terminal located at an outer side of each of the pair of differential signal terminals, a power supply terminal located at an inner side of each of the pair of differential signal terminals, and a reserved terminal located between the power supply terminal and the USB 2.0 terminals, the power supply terminal is located closer to the differential signal terminal than the reserved terminal, the power supply terminal in the upper row is partially located right above the recesses, and the power supply terminal in the lower row is partially located right below the recesses.

8. The electrical connector of claim 1, wherein the middle shielding sheet is provided with four of the first holes penetrating therethrough, wherein two of the four first holes are provided at each of two sides of the central line respectively, and the four first holes are arranged in a row with intervals along the transverse direction.

9. The electrical connector of claim 1, wherein the length of each of the first holes along the front-rear direction is greater than a width of each of the first holes along the transverse direction, and the width of the first middle hole along the transverse direction is greater than the length of the first middle hole along the front-rear direction.

10. The electrical connector of claim 1, wherein the spacer portion passes across the central line, the first middle hole is located right behind the spacer portion, and the two recesses are arranged axially and symmetrically about the central line serving as an axis of symmetry.

11. The electrical connector of claim 1, wherein the first middle hole is located between two of the first holes along the transverse direction.

12. The electrical connector of claim 1, wherein the middle shielding sheet is provided with a plurality of second holes, wherein at least one of the second holes is provided at each of the two transverse sides of the central line, and the second holes are located closer to the central line than the first holes.

13. The electrical connector of claim 12, wherein two of the second holes are arranged in a row along the transverse direction, and the second holes are further away from the spacer portion as compared to the first middle hole.

14. The electrical connector of claim 12, wherein:
the middle shielding sheet has a main body, and the main body has a front section located in the tongue;
a rear section extending backward from the front section is located in the base, the width of the rear section is greater than that of the front section in the transverse direction;
the front section is provided with the recesses, the spacer portion and the through-hole; and
the rear section is provided with the second holes.

15. The electrical connector of claim 1, wherein the middle shielding sheet is provided with a second middle hole and a third middle hole respectively at a front side and a rear side of the first middle hole, and the second middle hole and the third middle hole are respectively across the central line.

16. The electrical connector of claim 15, wherein the length of the second middle hole along the front-rear direction is shorter than that of the third middle hole along the front-rear direction.

17. The electrical connector of claim 1, wherein:
a shielding case wraps the insulating body, the shielding case comprises an inner case wrapping the insulating body and an outer case covering the inner case;
at least one first connection pin extends downward from the inner case along a vertical direction;
at least one second connection pin extends downward from the outer case along the vertical direction; and
the second connection pin is located in front of the first connection pin.

18. The electrical connector of claim 17, wherein two arc-shaped blocks respectively protrude upward from two sides of a top surface of the base, and viewed from a projection in the front-rear direction, the spacer portion is located between the two arc-shaped blocks.

* * * * *